(12) United States Patent
Herbach

(10) Patent No.: US 11,892,842 B2
(45) Date of Patent: Feb. 6, 2024

(54) METHODS AND SYSTEMS FOR VEHICLE OCCUPANCY CONFIRMATION

(71) Applicant: Waymo LLC, Mountain View, CA (US)

(72) Inventor: Joshua Herbach, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 178 days.

(21) Appl. No.: 17/452,493

(22) Filed: Oct. 27, 2021

(65) Prior Publication Data

US 2022/0050457 A1 Feb. 17, 2022

Related U.S. Application Data

(63) Continuation of application No. 16/534,000, filed on Aug. 7, 2019, now Pat. No. 11,163,307, which is a
(Continued)

(51) Int. Cl.
*G05D 1/00* (2006.01)
*H04N 7/18* (2006.01)
(Continued)

(52) U.S. Cl.
CPC .......... *G05D 1/0088* (2013.01); *B60N 2/002* (2013.01); *B60R 1/008* (2013.01); *B60R 22/48* (2013.01);
(Continued)

(58) Field of Classification Search
None
See application file for complete search history.

(56) References Cited

U.S. PATENT DOCUMENTS

| 4,355,385 A | 10/1982 | Hampshire |
| 5,986,670 A * | 11/1999 | Dries ............... G06F 30/13 |
| | | 345/629 |

(Continued)

FOREIGN PATENT DOCUMENTS

| JP | 2001239922 A | 9/2001 |
| JP | 2001307281 A | 11/2001 |

(Continued)

OTHER PUBLICATIONS

International Search Report issued in co-pending International Patent Application No. PCT/US2018/039860, ISK/KR—Koren Intellectual Property Office dated Oct. 22, 2018, 4 pages.

(Continued)

*Primary Examiner* — Daniel L Greene
(74) *Attorney, Agent, or Firm* — McDonnell Boehnen Hulbert & Berghoff LLP

(57) ABSTRACT

Example implementations relate to vehicle occupancy confirmation. An example implementation involves receiving, at a computing system from a camera positioned inside a vehicle, an image representing an occupancy within the vehicle. The implementation further involves, responsive to receiving the image, displaying the image on a display interface, and receiving an operator input confirming the occupancy meets a desired occupancy. The implementation additionally includes transmitting an occupancy confirmation from the computing system to the vehicle. In some instances, in response to receiving the occupancy confirmation, the vehicle executes an autonomous driving operation.

20 Claims, 10 Drawing Sheets

Related U.S. Application Data continuation of application No. 15/681,041, filed on Aug. 18, 2017, now Pat. No. 10,416,671.

(60) Provisional application No. 62/531,152, filed on Jul. 11, 2017.

(51) Int. Cl.
| | | |
|---|---|---|
| *B60R 1/00* | (2022.01) | |
| *B60N 2/00* | (2006.01) | |
| *B60R 22/48* | (2006.01) | |
| *G06T 11/60* | (2006.01) | |
| *B60W 40/08* | (2012.01) | |
| *G06V 20/59* | (2022.01) | |

(52) U.S. Cl.
CPC ............ *B60W 40/08* (2013.01); *G06T 11/60* (2013.01); *G06V 20/593* (2022.01); *H04N 7/183* (2013.01); *H04N 7/188* (2013.01); *B60R 2022/4816* (2013.01); *B60R 2300/105* (2013.01); *G05D 2201/0213* (2013.01)

(56) References Cited

U.S. PATENT DOCUMENTS

| | | | |
|---|---|---|---|
| 6,014,602 A | 1/2000 | Kithil | |
| 6,483,055 B1 | 11/2002 | Tanabe | |
| 6,523,964 B2* | 2/2003 | Schofield | B60R 1/12 |
| | | | 348/E7.086 |
| 6,626,463 B1 | 9/2003 | Arima | |
| 7,676,062 B2 | 3/2010 | Breed | |
| 8,520,695 B1 | 8/2013 | Rubin | |
| 9,123,186 B2* | 9/2015 | Ricci | H04W 4/21 |
| 9,436,182 B2 | 9/2016 | Nemec | |
| 9,504,346 B2 | 11/2016 | Levinson | |
| 9,606,539 B1 | 3/2017 | Kentley | |
| 9,817,400 B1* | 11/2017 | Poeppel | H04L 67/306 |
| 9,878,689 B1 | 1/2018 | Jimenez | |
| 10,268,191 B1* | 4/2019 | Lockwood | G05D 1/0038 |
| 2004/0049424 A1 | 3/2004 | Murray | |
| 2005/0156726 A1 | 7/2005 | Rubel | |
| 2007/0109107 A1 | 5/2007 | Liston | |
| 2007/0195990 A1 | 8/2007 | Levy | |
| 2008/0027599 A1 | 1/2008 | Logan | |
| 2009/0096200 A1 | 4/2009 | Jamison | |
| 2010/0063663 A1 | 3/2010 | Tolstedt | |
| 2012/0105632 A1* | 5/2012 | Renkis | G08B 13/1966 |
| | | | 348/143 |
| 2012/0197488 A1 | 8/2012 | Lee | |
| 2012/0259503 A1 | 10/2012 | Settles | |
| 2012/0296567 A1 | 11/2012 | Breed | |
| 2014/0309806 A1 | 10/2014 | Ricci | |
| 2014/0309866 A1 | 10/2014 | Ricci | |
| 2015/0055339 A1* | 2/2015 | Carr, Jr. | A47L 9/30 |
| | | | 362/234 |
| 2015/0088599 A1 | 3/2015 | Gatti | |
| 2015/0248131 A1 | 9/2015 | Fairfield | |
| 2015/0282280 A1 | 10/2015 | Sugimoto | |
| 2015/0346718 A1 | 12/2015 | Stenneth | |
| 2016/0046261 A1 | 2/2016 | Gulash | |
| 2016/0301698 A1 | 10/2016 | Katara | |
| 2016/0332535 A1* | 11/2016 | Bradley | G08B 21/24 |
| 2016/0334230 A1 | 11/2016 | Ross | |
| 2016/0357188 A1 | 12/2016 | Ansari | |
| 2016/0370801 A1 | 12/2016 | Fairfield | |
| 2017/0080900 A1* | 3/2017 | Huennekens | G08B 21/00 |
| 2017/0098364 A1 | 4/2017 | Jaegal | |
| 2017/0102242 A1* | 4/2017 | Breed | G08G 1/096716 |
| 2017/0330044 A1 | 11/2017 | Telpaz | |
| 2018/0022405 A1 | 1/2018 | Gecchelin | |
| 2018/0024695 A1* | 1/2018 | Iyer | G06F 3/0425 |
| | | | 345/175 |
| 2018/0144369 A1* | 5/2018 | Pouliot | G08G 1/161 |
| 2018/0236975 A1* | 8/2018 | Myers | G06V 40/193 |
| 2018/0259976 A1 | 9/2018 | Williams | |
| 2018/0297612 A1* | 10/2018 | Fukamachi | G06Q 10/02 |
| 2018/0321688 A1* | 11/2018 | Chase | G05D 1/0022 |
| 2018/0326944 A1 | 11/2018 | Cech | |
| 2018/0364728 A1* | 12/2018 | Yaldo | G06Q 10/20 |
| 2019/0259227 A1 | 8/2019 | Oesterling | |

FOREIGN PATENT DOCUMENTS

| | | |
|---|---|---|
| JP | 20155048005 A | 3/2015 |
| JP | 2015169985 A | 9/2015 |
| JP | 2015200933 A | 11/2015 |
| JP | 6145210 B1 | 6/2017 |
| JP | 6360015 B2 | 7/2018 |
| KR | 10-2012-0057195 A | 6/2012 |
| KR | 10-2015-0044197 A | 4/2015 |
| WO | 2017040929 A1 | 3/2017 |

OTHER PUBLICATIONS

Written Opinion issued in co-pending International Patent Application No. PCT/US2018/039860, ISK/KR—Koren Intellectual Property Office dated Oct. 22, 2018, 11 pages.

* cited by examiner

METHODS AND SYSTEMS FOR VEHICLE OCCUPANCY CONFIRMATION

CROSS REFERENCE TO RELATED APPLICATION

The present patent application is a continuation of U.S. patent application Ser. No. 16/534,000 (now U.S. Pat. No. 11,163,307), filed on Aug. 7, 2019, which is a continuation of U.S. patent application Ser. No. 15/681,041 (now U.S. Pat. No. 10,416,671), filed on Aug. 18, 2017, which claims priority to U.S. Provisional Patent Application Ser. No. 62/531,152, filed on Jul. 11, 2017, all of which are hereby incorporated by reference in their entirety.

BACKGROUND

Vehicles are used to complete various types of tasks, including object and people transportation. With advances in technology, some vehicles are configured with systems that enable the vehicles to operate in a partial or fully autonomous mode. When operating in a partial or fully autonomous mode, some or all of the navigation aspects of vehicle operation are controlled by a vehicle control system rather than a traditional human driver. Autonomous operation of a vehicle can involve systems sensing the vehicle's surrounding environment to enable a computing system to plan and safely execute navigating routes to reach desired destinations.

SUMMARY

Example implementations relate to vehicle occupancy confirmation. A vehicle capable of autonomous or semi-autonomous operation may safely transport passengers to desired destinations using sensor measurements of the surrounding environment from vehicle sensors. Since autonomous operation can enable the vehicle to provide transportation in a manner similar to a chauffeur service, situations may arise where the vehicle control system (or another system) of the vehicle requires assistance with confirming whether the vehicle's current occupancy meets a desired occupancy (e.g., a number of expected passengers). In particular, communication between the vehicle control system and another computing system may enable a human operator to use the computing system to view images depicting the interior of the vehicle and potentially other information captured and provided by cameras and other sensors of the vehicle. The computing system receiving images and other information from the vehicle may further enable the operator to provide an operator input that can confirm that the current occupancy of vehicle meets the desired occupancy. Upon receiving the operator input at the vehicle control system from the operator's computing system, the vehicle may execute an autonomous operation or series of operations in response.

In one aspect, an example method is provided. The method may include receiving, at a computing system from a camera positioned inside a vehicle, an image representing an occupancy within the vehicle, and responsive to receiving the image, displaying, by the computing system, the image on a display interface. The method may further include receiving, at the computing system, an operator input confirming the occupancy meets a desired occupancy, and transmitting an occupancy confirmation from the computing system to the vehicle. In response to receiving the occupancy confirmation, in some instances, the vehicle executes an autonomous driving operation.

In another aspect, an example system is provided. The system may include a vehicle, a computing system, a non-transitory computer readable medium, and program instructions stored on the non-transitory computer readable medium executable by the computing system to receive, from a camera positioned inside a vehicle, an image representing an occupancy within the vehicle, and responsive to receiving the image, display the image on a display interface. The program instructions are further executable by the computing system to receive an operator input confirming the occupancy meets a desired occupancy, and to transmit an occupancy confirmation to the vehicle. In some instances, in response to receiving the occupancy confirmation, the vehicle executes an autonomous driving operation.

In yet another example, an example non-transitory computer readable medium having stored therein program instructions executable by a computing system to cause the computing system to perform functions is provided. The functions may include receiving, from a camera positioned inside a vehicle, an image representing an occupancy within the vehicle, and responsive to receiving the image, displaying the image on a display interface. The functions may further include receiving an operator input confirming the occupancy meets a desired occupancy, and transmitting an occupancy confirmation to the vehicle. In some instances, in response to receiving the occupancy confirmation, the vehicle executes an autonomous driving operation.

In a further aspect, another example system having means for vehicle occupancy confirmation is provided. The system may include means for receiving, from a camera positioned inside a vehicle, an image representing an occupancy within the vehicle, and means for displaying the image on a display interface in response to receiving the image. The system may also include means for receiving an operator input confirming the occupancy meets a desired occupancy, and means for transmitting an occupancy confirmation to the vehicle. In response to receiving the occupancy confirmation, in some instances, the vehicle executes an autonomous driving operation.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
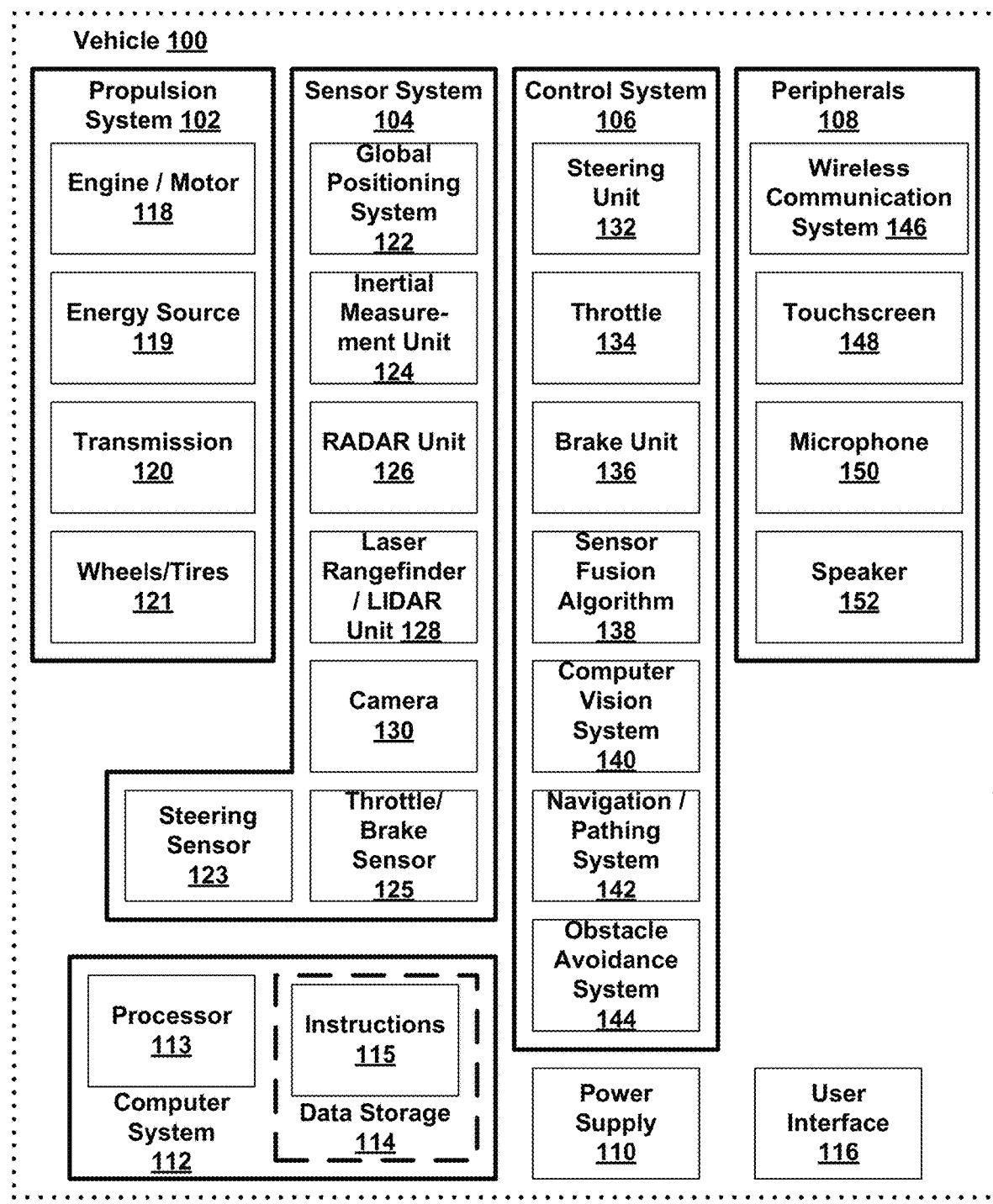
FIG. 1 is a functional block diagram illustrating a vehicle, according to example implementations.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting.

Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As discussed above, recent advancements in computing, sensors and other technologies have enabled vehicles to navigate autonomously between locations without requiring input from a driver. By processing measurements of the surrounding environment from vehicle sensors in near real-time, an autonomous vehicle can transport passengers or objects between locations while avoiding obstacles and obeying traffic requirements. The shift of control of the vehicle over to a vehicle control system enables passengers to devote their attention to tasks other than driving.

The rise of autonomous vehicles has contributed to an increase usage of vehicle-sharing. Vehicle-sharing can often involve a fleet of vehicles that are centrally-managed by an overall system that is configured to receive requests from potential passengers and dispatch nearby vehicles to locate, pick up, and provide one-time rides to passengers in exchange for a small fee.

Within the fleet, each vehicle may fulfill requests for rides from passengers. For instance, a passenger may use a smartphone application or another computing device to submit a request to the system managing the fleet of vehicles. The request may include information to assist the system complete the request, such as a current location of the passenger, a quantity of passengers that plan on receiving transportation, and one or more desired destinations for the vehicle to drop off passengers. In response to receiving the request, the system may identify and dispatch a vehicle within the fleet that can quickly travel to the passenger's current location and autonomously transport the passenger or passengers to one or more desired destinations accordingly. After completing a ride request, the vehicle may subsequently be dispatched to provide transportation for other passengers.

Whether operating as part of a vehicle-sharing fleet or independently, a vehicle capable of autonomous or semi-autonomous operation may encounter some situations where a vehicle control system of the vehicle requires additional assistance. In particular, situations can arise where the vehicle control system requires assistance with confirming whether or not the current occupancy of the vehicle meets a desired occupancy. For example, the vehicle control system may request assistance with confirming that a correct number of passengers are currently positioned inside the vehicle and ready for transportation (e.g., buckled up in seats) prior to providing transportation for the passengers. In such a situation, the correct number of passengers (i.e., the desired occupancy) may depend on the original transportation request or other input submitted by the passenger, the number of seats available within the vehicle, and/or other potential parameters.

In some implementations, in order to receive assistance, a vehicle control system may transmit a request for assistance to another computing system or multiple other computing systems. Particularly, the request for assistance may seek for a computing system or a human operator using the computing system to provide assistance. For example, in a situation where the vehicle control system requires assistance with confirming that the vehicle's occupancy meets a desired occupancy, the vehicle control system may submit a request for assistance along with images or other sensor data from vehicle sensors that can enable the computing system or a human operator to confirm whether or not the occupancy of the vehicle meets a desired occupancy.

As an example, the request for assistance may include images depicting the interior of the vehicle including any objects or passengers inside the vehicle and also include a question that asks the computing system or human operator to confirm whether there are X number of passengers in the vehicle as initially determined by the vehicle control system. In other examples, the vehicle control system may request assistance with determining the quantity of passengers without providing an initial estimation previously determined by the vehicle control system. For instance, the vehicle control system may provide a request for assistance that queries "How many passengers are currently positioned inside the vehicle?" The vehicle control system may also request assistance with determining other information that the vehicle control system may utilize to help improve a passenger's experience using the vehicle for transportation.

In some examples, the vehicle control system may engage in wireless communication with a computing system that is positioned remotely from the vehicle in order to receive assistance. Particularly, the vehicle control system may provide images or other information to the computing system via the wireless communication, which may then be configured to utilize software to assist the vehicle control system. For instance, the computing system may analyze images provided by the vehicle using computer vision to determine the number of passengers currently occupying the vehicle. In other examples, the vehicle control system may communicate with one or more computing systems via a wired connection in order to receive assistance. As an example, the vehicle control system may communicate with a computing system positioned inside the vehicle in order to receive assistance from one or multiple passengers inside the vehicle.

In further examples, upon receiving images depicting the interior of the vehicle or other information from the vehicle, a computing system may be configured to display the images and other information using a graphical user interface that can enable a human operator to review and potentially provide assistance to the vehicle control system via the computing system. The term "human operator" represents any person that may use the computing system to review images depicting the interior of the vehicle or other information provided by the vehicle in order to provide some form of assistance to the vehicle. For instance, a human operator may utilize a computing system that receives information from the vehicle in order to confirm or deny that the current occupancy of the vehicle meets a desired occupancy for the situation that the vehicle is currently in. In response to receiving an operator input, the computing system configured to display vehicle information may also relay the operator input to the vehicle control system to enable the vehicle control system to proceed accordingly based on the input.

Within examples, different reasons may cause a vehicle control system to request some form of assistance. For instance, as indicated above, a vehicle control system may request assistance with confirming if the current occupancy meets the desired occupancy as a pre-navigation check to ensure that the vehicle transports a predetermined number of passengers.

Similarly, in other situations, the vehicle control system may review the current occupancy of the vehicle in order to determine the number of passengers that entered or exited at a particular location. For example, the vehicle may receive and accept a request to pick up and transport three passengers between locations. After initially picking up the passengers, the vehicle control system may transmit a request for assistance with confirming that three passengers (i.e., the desired occupancy) are in fact currently occupying the vehicle before the vehicle starts transporting the passengers to one or multiple drop off locations. The vehicle control system may also transmit one or multiple subsequent requests to confirm that the passengers all exited the vehicle at the drop off location or locations.

In some example implementations, the desired occupancy for a vehicle may vary depending on the current situation or a future situation for the vehicle. For instance, the desired occupancy may depend on the ride request originally accepted by the autonomous vehicle. More specifically, a ride request may specify that the number of passengers that desire transportation and one or multiple respective locations of the passengers. As such, the desired occupancy may reflect the number of passengers that are supposed to enter into the vehicle at the specified location or locations.

In other examples, the vehicle control system may have a desired occupancy that requires at least one passenger enters the vehicle at a given location prior to the vehicle initiating an autonomous control strategy. The desired occupancy may be configured such that the vehicle control system ensures the vehicle is providing transportation for at least the passenger that requested transportation. As an example, the vehicle control system may receive input from a passenger or a vehicle sensor as the passenger enters into the vehicle. In response to the input indicating the presence of the passenger, the vehicle control system may utilize assistance to confirm that the passenger is prepared for transportation to a desired destination. In further examples, the vehicle control system may be configured to check that the occupancy meets a desired occupancy that depends on other potential factors.

In a further example implementation, the vehicle control system may be configured to determine that a particular passenger is located within the vehicle prior to providing transportation. As a result, the vehicle control system may request assistance with confirming the identity of one or multiple passengers. For instance, the vehicle control system may seek assistance to ensure that the correct passenger entered into the vehicle assigned to fulfill the passenger's ride request.

In some examples, in order to obtain assistance with identifying a passenger, the vehicle control system may provide images or other information to another computing system that can display the images or information to enable a human operator to help identify the passenger. In response to receiving assistance, the vehicle control system may use a passenger's identification for various reasons, such as to confirm that the correct passenger is present in the vehicle (i.e., the passenger that requested the transportation), to determine navigation operations or drop off locations, to facilitate payment for transportation, or other possible reasons.

In response to receiving assistance, a vehicle may perform one or multiple autonomous operations. In particular, the autonomous operations can vary depending on the situation, the confirmation or assistance provided, or other parameters (e.g., quantity of passengers, location of the vehicle). In some examples, the autonomous operation may involve transporting the passenger or passengers to one or multiple target locations. In such a situation, the vehicle may execute navigation operations that involve transporting the passengers to requested desired destination(s) safely. In further examples, the vehicle control system may utilize a passenger's identification for to adjust current settings of the vehicle (e.g., music, temperature) to enhance the passenger's experience. For example, the vehicle control system may access an account of the passenger that specifies particular settings that the passenger prefers during transportation.

In some examples, a vehicle control system may submit a request for assistance to confirm whether or not passengers currently occupying the vehicle are prepared for the vehicle to provide transportation. In particular, the vehicle control system may submit a request for a computing system or a human operator utilizing the computing system to confirm whether or not the passengers are using seatbelts. In response to receiving a confirmation from the computing system (or from the human operator via the computing system) that indicates all passengers are prepared for travel (e.g., sitting and buckled up), the vehicle control system may initiate transportation.

In another example implementation, a vehicle control system may submit a request for assistance to confirm that all passengers exiting the vehicle did not leave any items (e.g., purse, cellphone, and bag) behind inside the vehicle. For instance, the vehicle control system may submit a request for assistance from a human operator to confirm that the passengers did not leave any personal belongings behind in the vehicle after receiving transportation from the vehicle. The vehicle control system may transmit one or multiple images to a computing system along with the request that can enable a human operator (or the computing system) to identify any items that the recent passengers may have left behind. Upon receiving a confirmation from the computing system (or the human operator via the computing system) that indicates that there are no items left in the vehicle from the passengers, the vehicle control system may initiate an autonomous operation (e.g., go pick up a new passenger).

In further examples, the vehicle control system may utilize assistance to help maintain the condition of the vehicle. For instance, the vehicle control system may request assistance with monitoring the actions or behavior of one or multiple passengers within the vehicle. The vehicle control system may provide images or video/audio to a computing system that enables a human operator to view and monitor the actions or behavior of passengers occupying the vehicle. For instance, the vehicle control system may establish a live communication session with the computing system to enable the passengers and human operator to communicate in near-real time. As an example, the vehicle control system may establish the wireless communication connection to enable a human operator to monitor a passenger receiving transportation to a medical facility. In the example, the human operator may provide assistance or comfort to the passenger receiving transportation. In another example, the vehicle control system may establish a wireless communication connection to enable a human operator (e.g., a parent) to view activities by passengers currently occupying the vehicle (e.g., the parent's children receiving transportation to school).

Example systems within the scope of the present disclosure will now be described in greater detail. An example system may be implemented in or may take the form of an automobile, but other example systems can be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system (i.e., vehicle control system). As such, vehicle 100 may be configured to seek assistance in situations that require additional review.

As part of operating in the autonomous mode, vehicle 100 may use sensors to detect and possibly identify objects of the surrounding environment to enable safe navigation. In some implementations, vehicle 100 may also include subsystems that enable a driver to control operations of vehicle 100.

As shown in FIG. 1, vehicle 100 may include subsystems, such as propulsion system 102, sensor system 104, control system 106, peripheral(s) 108, power supply 110, computer system 112, data storage 114, and user interface 116. In other examples, vehicle 100 may include more or fewer subsystems, which can each include multiple elements.

The subsystems and components of vehicle 100 may be interconnected in various ways. In addition, functions of vehicle 100 described herein can be divided into additional functional or physical components, or combined into fewer functional or physical components within implementations.

Propulsion system 102 may include component(s) operable to power vehicle 100 and can include engine/motor 118, energy source 119, transmission 120, and wheels/tires 121, among other possible components. For example, engine/motor 118 may convert energy source 119 into mechanical energy. As such, engine/motor 118 can correspond to one or a combination of an internal combustion engine, an electric motor, steam engine, or Stirling engine, among other options. For instance, propulsion system 102 may include multiple types of engines/motors, such as both a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among others. Sensor system 104 may also include sensors configured to monitor internal systems of the vehicle 100 (e.g., 02 monitor, fuel gauge, engine oil temperature, brakes wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent systems configured to use radio signals to sense objects, including the speed and heading of the objects, within the local environment of vehicle 100. As such, radar 126 may include antennas configured to transmit and receive radio signals. In some implementations, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor).

Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communications, such as WiMAX or LTE. Alternatively, wireless communication system 146 may communicate with a wireless local area network (WLAN) using WiFi or other possible connections.

Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may further include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway.

Additionally, the combination of GPS 122 and the features recognized by computer vision system 140 may be used with map data stored in data storage 114 to determine specific road parameters. Further, radar unit 126 may also provide information about the surroundings of the vehicle. In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
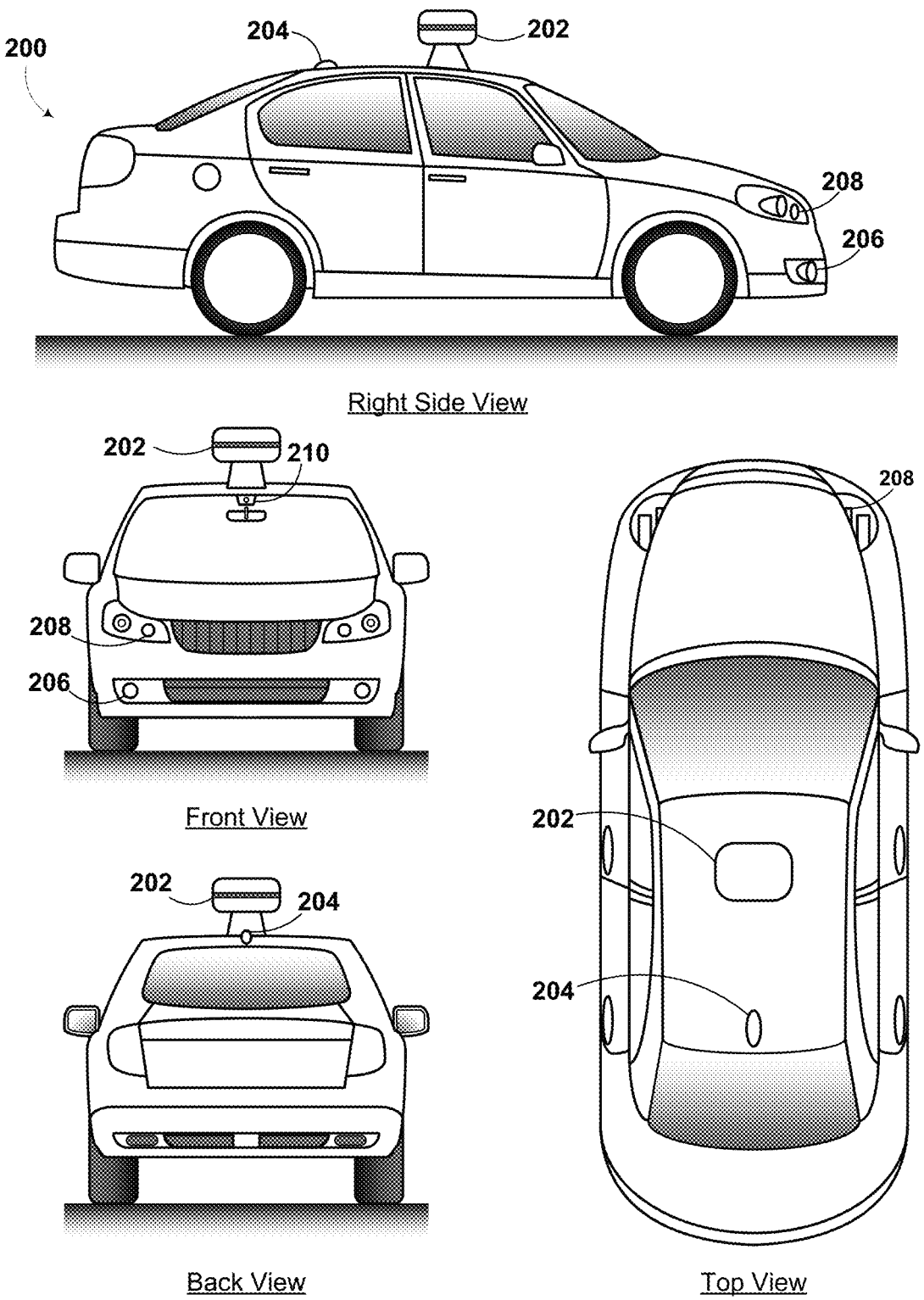
FIG. 2 is a conceptual illustration of a physical configuration of a vehicle, according to example implementations.

FIG. 2 depicts an example physical configuration of vehicle 200, which may represent one possible physical configuration of vehicle 100 described in reference to FIG. 1. Depending on the embodiment, vehicle 200 may include sensor unit 202, wireless communication system 204, radio unit 206, deflectors 208, and camera 210, among other possible components. For instance, vehicle 200 may include some or all of the elements of components described in FIG. 1. Although vehicle 200 is depicted in FIG. 2 as a car, vehicle 200 can have other configurations within examples, such as a truck, a van, a semi-trailer truck, a motorcycle, a golf cart, an off-road vehicle, robotic device, or a farm vehicle, among other possible examples.

Sensor unit 202 may include one or more sensors configured to capture information of the surrounding environment of vehicle 200. For example, sensor unit 202 may include any combination of cameras, radars, LIDARs, range finders, radio devices (e.g., Bluetooth and/or 802.11), and acoustic sensors, among other possible types of sensors.

In some implementations, sensor unit 202 may include one or more movable mounts operable to adjust the orientation of sensors in sensor unit 202. For example, the movable mount may include a rotating platform that can scan sensors so as to obtain information from each direction around the vehicle 200. The movable mount of sensor unit 202 may also be moveable in a scanning fashion within a particular range of angles and/or azimuths.

In some implementations, sensor unit 202 may include mechanical structures that enable sensor unit 202 to be mounted atop the roof of a car. Additionally, other mounting locations are possible within examples.

Wireless communication system 204 may have a location relative to vehicle 200 as depicted in FIG. 2, but can also have different locations within implementations. Wireless communication system 200 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems.

Camera 210 may have various positions relative to vehicle 200, such as a location on a front windshield of vehicle 200. As such, camera 210 may capture images of the environment of vehicle 200. As illustrated in FIG. 2, camera 210 may capture images from a forward-looking view with respect to vehicle 200, but other mounting locations (including movable mounts) and viewing angles of camera 210 are possible within implementations. In some examples, camera 210 may correspond to one or more visible light cameras. Alternatively or additionally, camera 210 may include infrared sensing capabilities. Camera 210 may also include optics that may provide an adjustable field of view.

Figure 3A:
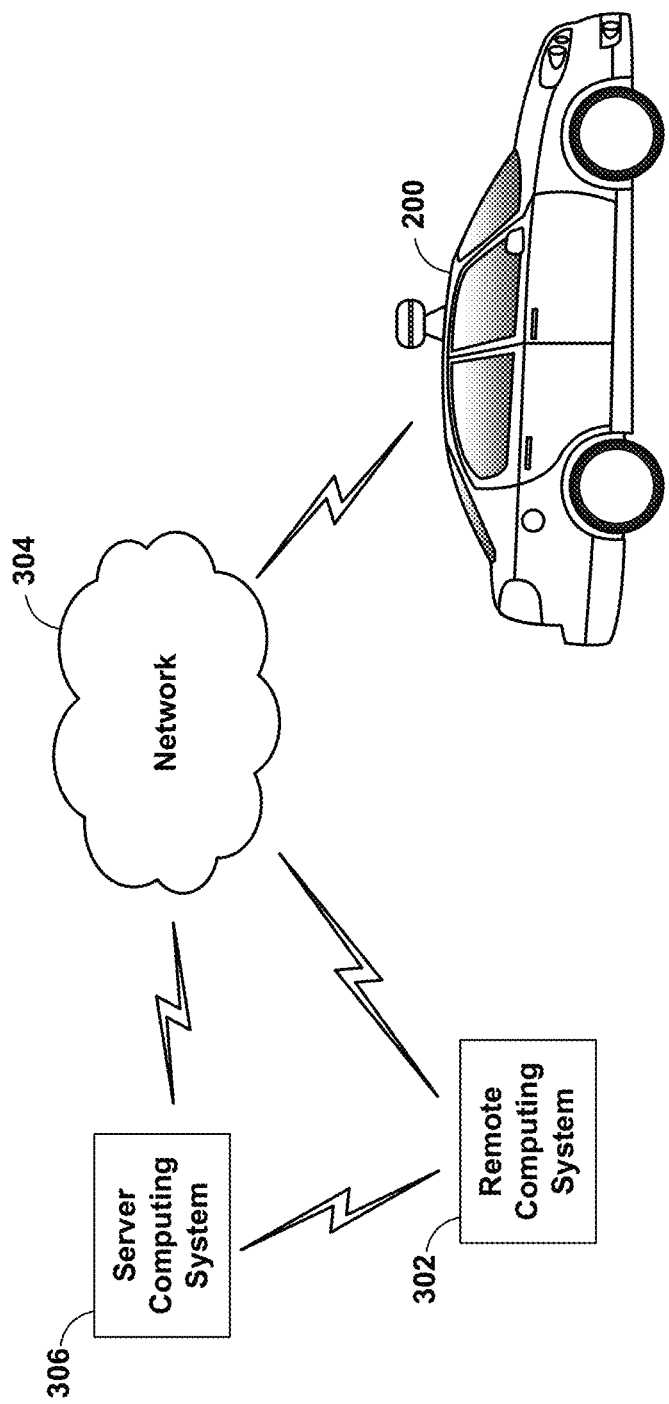
FIG. 3A is a conceptual illustration of wireless communication between various computing systems related to an autonomous vehicle, according to example implementations.

FIG. 3A is a conceptual illustration of wireless communication between various computing systems related to an autonomous vehicle, according to example implementations. Particularly, remote computing system 302, server computing system 306, and vehicle 200 may communicate wireless via network 304.

Vehicle 200 may transport passengers or objects between locations, and may take the form of any one or more of the vehicles discussed above. When operating in an autonomous mode, vehicle 200 may navigate with or without passengers enabling vehicle 200 to pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. As such, remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some implementations, remote computing system 302 may also include a user interface that includes input/output devices, such as a touchscreen and a speaker. Other examples are possible as well.

The position of remote computing system 302 can vary within examples. For instance, remote computing system 302 may have a remote position from vehicle 200 utilizing wireless communication via network 304. In another example, remote computing system 302 may correspond to a computing device within vehicle 200 that is physically separate from vehicle 200, but with which a human operator can interact while as a passenger or driver of vehicle 200. In some examples, remote computing system 302 may be a computing device with a touchscreen operable by the passenger of vehicle 200.

In some implementations, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Network 304 represents infrastructure that can enable wireless communication between remote computing system 302 and vehicle 200. Network 304 also can enable wireless communication between server computing system 306 and remote computing system 302, and between server computing system 306 and vehicle 200.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some implementations of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200. The various systems described above may perform various operations. These operations and related features will now be described.

In some examples, a remote computing system (e.g., remote computing system 302 or perhaps server computing system 306) may operate in one of two modes. The first of these modes may serve, in essence, as a means for a human operator (of the vehicle and/or the remote computing system) to provide remote assistance support for the vehicle, particularly in scenarios in which occupancy detection or passenger identification confidence is low. The remote computing system may enable a human operator to provide this support in near real-time or less frequently than real-time.

The second of these two modes may serve, at a minimum, as a means for keeping the human operator alert. The human operator may be a passenger or driver of the vehicle, or may be a third party located remotely from the vehicle but tasked with the responsibility of providing remote assistance to the vehicle (and possibly to other vehicles as well). Regardless of who the human operator is, it is desirable to keep the human operator alert so that the human operator can provide optimal remote assistance with minimal delay.

For instance, there may be scenarios in which the vehicle may not have requested remote assistance in a certain amount of time (e.g., one hour), and therefore the human operator tasked with providing remote assistance to the vehicle may not have taken any remote assistance action in that amount of time, which may be long enough where the human operator may become fatigued or otherwise less attentive than desirable. In these and other types of possible scenarios, it may be desirable to periodically prompt the human operator during this time, via the remote computing system, with alertness data to keep them alert. The alertness data may take various forms, such as archived images, audio, or video having confirmed or unconfirmed object identifications, also including generated natural-language questions regarding the confirmed or unconfirmed object identifications.

Remote assistance tasks may also include the human operator providing an instruction to control operation of the vehicle (e.g., instruct the vehicle to travel to a particular destination associated with an identified passenger). In some scenarios, the vehicle itself may control its own operation based on the human operator's feedback related to the identification of the object. For instance, upon receiving a confirmation that the occupancy of the vehicle meets a desired occupancy, the vehicle control system may cause the vehicle to safely transport the passengers to a requested destination.

Figure 3B:
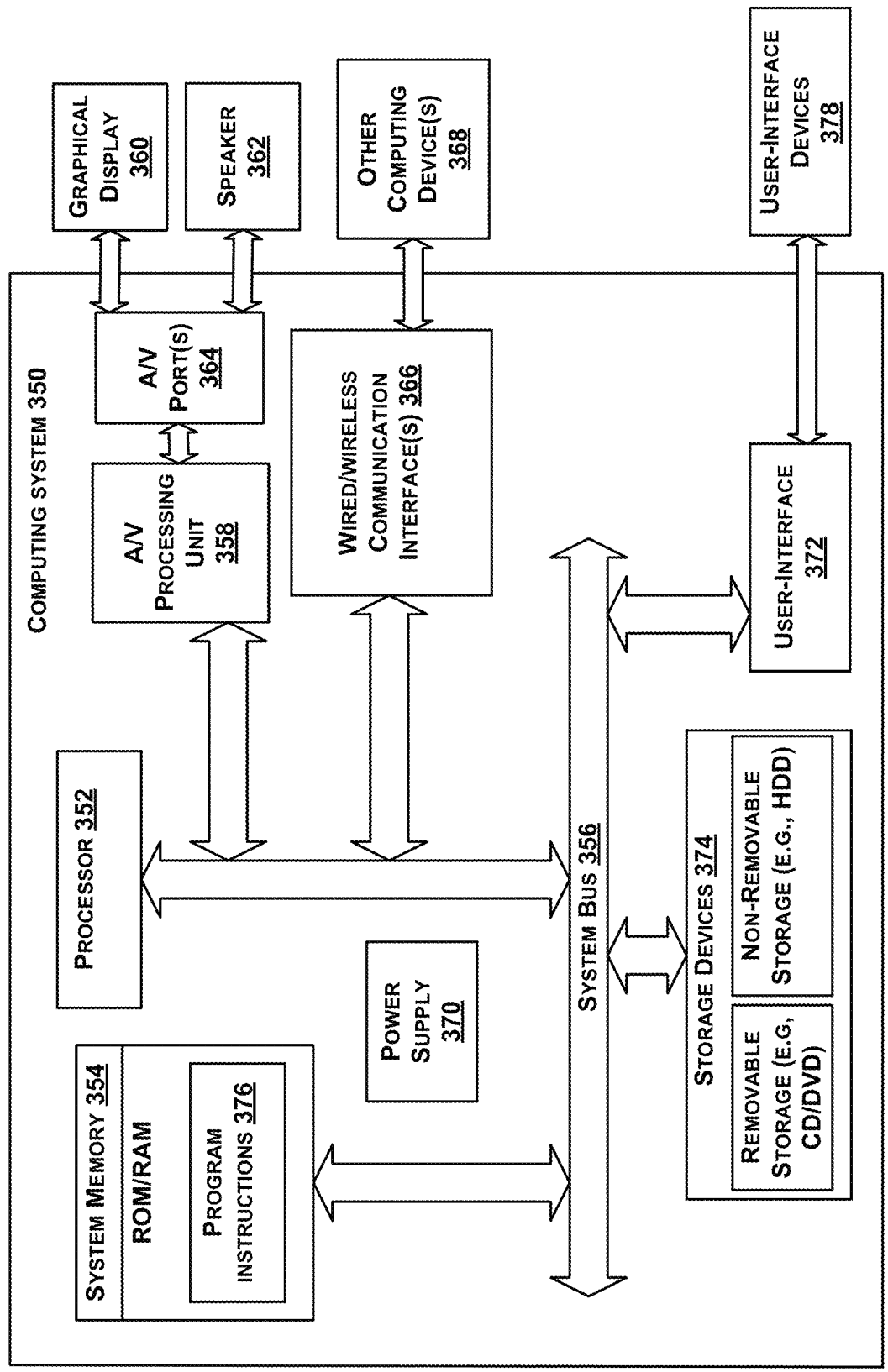
FIG. 3B shows a simplified block diagram depicting components of a computing system, according to example implementations.

FIG. 3B shows a simplified block diagram depicting example components of an example computing system 350. One or both of remote computing system 302, or perhaps server computing system 306, may take the form of computing system 350.

Computing system 350 may include at least one processor 352 and system memory 354. In an example embodiment, computing system 350 may include system bus 356 that can communicatively connect processor 352 and system memory 354, as well as other components of computing system 350. Depending on the desired configuration, processor 352 can be any type of processor including, but not limited to, a microprocessor (μP), a microcontroller (μC), a digital signal processor (DSP), or any combination thereof. Furthermore, system memory 354 can be of any type of memory now known or later developed including but not limited to volatile memory (such as RAM), non-volatile memory (such as ROM, flash memory, etc.) or any combination thereof.

Computing system 350 may include various other components. For example, computing system 350 may include A/V processing unit 358 for controlling graphical display 360 and speaker 362 (via A/V port 364), one or more communication interfaces 366 for connecting to other computing devices 368, and power supply 370.

Graphical display 360 may be arranged to provide a visual depiction of various input regions provided by user-interface module 362. For example, user-interface module 362 may be configured to provide a user-interface, and graphical display 360 may be configured to provide a visual depiction of the user-interface. User-interface module 362 may be further configured to receive data from and transmit data to (or be otherwise compatible with) one or more user-interface devices 368.

Furthermore, computing system 350 may also include one or more data storage devices 374, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital video disk (DVD) drives, solid state drives (SSD), and/or any other storage device now known or later developed.

Computer storage media can include volatile and non-volatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital video disk (DVD) or other optical storage, magnetic cassettes, magnetic tape, magnetic disk storage or other magnetic storage devices, or any other medium now known or later developed that can be used to store the desired information and which can be accessed by computing system 300.

Figure 4:
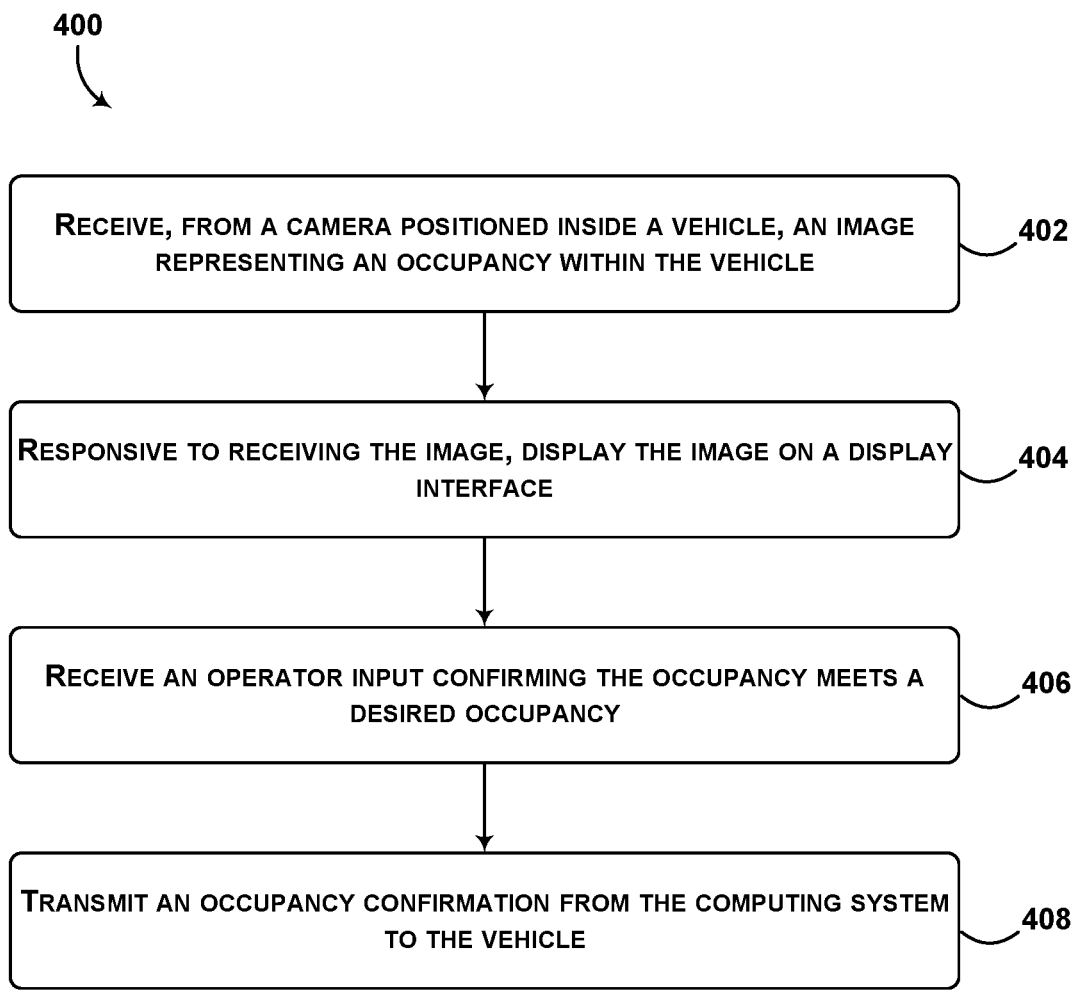
FIG. 4 is a flow chart of a method for vehicle occupancy confirmation, according to example implementations.

According to an example embodiment, computing system 350 may include program instructions 376 that are stored in system memory 354 (and/or possibly in another data-storage medium) and executable by processor 352 to facilitate the various functions described herein including, but not limited to, those functions described with respect to FIG. 4. Although various components of computing system 350 are shown as distributed components, it should be understood that any of such components may be physically integrated and/or distributed according to the desired configuration of the computing system.

FIG. 4 is a flow chart of a method for vehicle occupancy confirmation, according to example implementations. Method 400 represents an example method that may include one or more operations, functions, or actions, as depicted by one or more of blocks 402, 404, 406, and 408, each of which may be carried out by any of the systems shown in FIGS. 1, 2, 3A, 3B, among other possible systems.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 402, method 400 includes receiving, from a camera positioned inside a vehicle, an image representing an occupancy within the vehicle. As discussed above, a vehicle control system or other system of a vehicle may encounter a situation that can result in the vehicle control system or other system seeking assistance. In particular, the vehicle control system may submit a request for assistance to one or more other computing systems. In order to enable the other computing system or a human operator using the computing system to provide assistance, the vehicle control system may also provide information, such as images or other sensor data, to the computing system along with the request for assistance. As a result, the computing system may utilize the information provided or display the information for the human operator to use in order to assist the vehicle.

In some example implementations, the vehicle control system may provide one or multiple images representing an occupancy within the vehicle to the other computing system or systems. The images may depict the interior of the vehicle and may enable the computing system or a human operator to help determine if the current occupancy of the vehicle meets a desired occupancy. For instance, the computing system may receive images from a vehicle camera that is mounted to the interior of the vehicle such that the camera captures images depicting the vehicle's interior.

In a further example, the computing system may receive multiple images captured from one or multiple cameras of the vehicle camera system. For instance, the computing system may receive a first image depicting the occupancy within the vehicle from a first camera and also receive a second image depicting the occupancy from a second camera. Within examples, the first camera and the second camera may have orientations such that each camera captures images depicting the same area of the vehicle's interior or the cameras can have different orientations such that the images depict different portions of the vehicle's interior.

Additionally, in some example implementations, the computing system may receive additional information from the vehicle control system. For instance, the vehicle control system may transmit audio data to the computing system. The audio data may correspond to sounds, voices, and other noises captured within the interior of the vehicle by one or more microphones. As such, the computing system may receive the audio data with or without corresponding images.

In further examples, the computing system may also receive other types of information (e.g., different sensor measurements) from the vehicle control system. Particularly, the sensors can vary in type, detection methods, placement relative to the vehicle, information captured, as well as other potential parameters. For example, the computing system may receive information that helps depict the current occupancy of the vehicle from a combination of sensors (e.g., camera, motion sensor).

Within examples, the position of the computing system receiving the image or other data from the vehicle can differ. For instance, in some examples, the computing system can have a position at a remote location away from the vehicle. At a remote position, the computing system may receive the images and information using wireless communication with the vehicle control system or another system of the vehicle. In other examples, the computing system can be positioned inside the vehicle and may receive information from the vehicle control system or another system of the vehicle via a wired connection. When the computing system is positioned inside the vehicle, the computing system may enable one or multiple passengers to provide input and observe output from the vehicle control system or other system of the vehicle. In further examples, the vehicle control system may communicate with multiple computing systems, which might include a computing system positioned inside the vehicle and a computing system positioned at a remote location from the vehicle.

Within examples, the images or other sensor data depicting the occupancy within the vehicle may represent the current occupancy of the vehicle or prior measurements. For instance, in some examples, the vehicle control system may provide images captured during prior transportation provided to previous passengers by the vehicle. In other examples, the vehicle control system may provide images and other information that may depict the current occupancy and situation of the vehicle.

At block 404, method 400 includes responsive to receiving the image, displaying the image on a display interface.

After receiving images or other information from the vehicle control system or other system of the vehicle, the computing system may be configured to display the images and other information via a display interface, such as a Light-emitting diode display (LED) or a touchscreen, among other options. In addition to displaying the information, the computing system may also include an interface that enables a human operator to manipulate the information. For instance, the interface may enable a human operator to focus upon a particular portion or portions of the image or information displayed by the computing system.

In some examples, the computing system may process incoming images received from the vehicle using computer vision or other techniques prior to displaying the images. As an example, the computing system may use computer vision to focus upon passengers depicted within images. In other instances, the computing system may utilize computer software to focus upon other aspects in the images received.

In addition, the computing system may further use computer vision to help confirm that the current occupancy within the vehicle meets a desired occupancy or to help guide a human operator viewing the images via signals or other markers. For example, the computing system may use computer vision to place boxes around faces of each passenger captured within a given image received from the vehicle.

In some examples, the computing system may also modify one or multiple images received from the vehicle to further include one or more enhancement graphics when displayed. For instance, the computing system may add enhancement graphics that include graphical text indicating a location of the vehicle or indicate the number of passengers that the vehicle control system estimated to be present within the vehicle. In another example, the computing system may include text that dictates the request provided by the vehicle control system for a human operator to answer. For instance, the computing system may include text that requests the human operator to confirm or deny that the quantity of passengers that the vehicle control system estimated to be present within the vehicle is accurate. As such, the computing system may display modified images and other information on the display interface.

In further examples, the computing system may also provide other sensor data, audio data, or other information via system interfaces. For instance, the computing system may provide audio data and images in an audiovisual format. In an additional example, the computing system may also enable a human operator to engage in near-real time wireless communication with an audio or audiovisual system of the vehicle such that passengers of the vehicle can communicate with the human operator via the computing system in near-real time.

At block 406, method 400 includes receiving an operator input confirming the occupancy meets a desired occupancy. After displaying images or other sensor data representing the occupancy of the vehicle, the computing system may receive an operator input from a human operator. In particular, the human operator may correspond to a person that uses the computing system to review images and other information received from the vehicle in order to provide assistance.

The operator input received at the computing system may depend on the assistance request originally provided by the vehicle. For instance, in a situation where the vehicle control system transmits a request to the computing system that seeks to confirm whether or not the current occupancy meets a current desired occupancy for the vehicle, the computing system may receive an operator input that confirms or denies that the current occupancy meets the desired occupancy. Similarly, if the original request from the vehicle control system asks assistance with confirming that a past occupancy had met a past desired occupancy, the operator input may confirm whether or not the past occupancy met the prior desired occupancy. For instance, the operator input may confirm that the vehicle transported the correct number of passengers as requested in the ride request that the vehicle recently completed.

In some examples, the assistance request from the vehicle may request for additional information, such as a confirmation of the identity or passenger-profile of one or multiple passengers. The vehicle control system may utilize a passenger's identification or passenger-profile to help confirm that the correct passenger is in the vehicle, to determine an end destination for dropping off the passenger, to adjust settings or facilitate payment for the ride, among other possibilities. As such, in situations where the assistance request received at the computing system from the vehicle requests for additional information, the computing system may receive an operator input from the operator that provides the additional information. For instance, the operator input may confirm the identity or passenger-profile for one or multiple passengers inside the vehicle.

In other examples, the operator input may provide other information, such as identifying positions of the passengers inside the vehicle or an indication that the passengers are buckled up using seatbelts and ready for transportation. In further examples, the operator input may include additional information that the human operator voluntarily provided for the vehicle to utilize or for the computing system to store in memory as associated with that given assistance request.

The computing system may receive operator inputs using various types of interfaces within examples. For instance, the computing system may include a touchscreen or other physical interfaces that enables the human operator to provide input to the computing system. In addition, the computing system may also receive motion or vocal inputs from the human operator using a microphone or motion sensors, among other possibilities.

The human operator can also differ within examples. For instance, in some situations, the human operator may be a person assigned to provide assistance to the vehicle or multiple vehicles. As an example, the human operator may be a person that uses the computing system at a remote location from one or more vehicles and may be assigned to provide assistance to a fleet of vehicles operating in a particular geographic area (e.g., within city limits).

In another example, the human operator may be a person that owns the vehicle or rights to operation of the vehicle. For instance, the vehicle control system may seek assistance from the human operator in situations where the human operator lends the vehicle to perform transportation for other potential passengers.

In a further example, the human operator using the computing system may be a passenger inside the vehicle that is requesting assistance. In particular, the vehicle control system of the vehicle may communicate with the human operator via the computing system through a wired or wireless connection. As such, the passenger serving as the human operator may help confirm whether or not the current occupancy of the vehicle meets a desired occupancy (e.g., all the passengers requesting transportation are present inside the vehicle). In some situations, the passenger may also provide additional information to the vehicle control system, such as identity information, target destinations for drop off, or payment-related information.

As indicated above, the operator input may confirm whether the occupancy of the vehicle meets a desired occupancy. Within examples, the desired occupancy can vary and may depend on various factors, such as the ride request being performed by the vehicle, the type of vehicle, etc. For instance, in some situations, the desired occupancy may represent a quantity of passengers that the vehicle control system expects to occupy the vehicle before the vehicle begins transporting the passengers.

As an example, a vehicle may be dispatched to fulfill a ride request from a potential passenger that seeks transportation for three passengers overall. As such, upon arriving at the pickup location of the passengers, the vehicle control system may wait to transport the passengers until confirming that three passengers are indeed currently occupying the vehicle. In such a situation, the vehicle control system may request assistance from a human operator to confirm whether or not the three passengers are positioned inside the vehicle signaling that the desired occupancy is fulfilled.

In another example implementation, the vehicle control system may set the desired occupancy to require at least one passenger occupies the vehicle prior to the vehicle executing an autonomous control operation. In turn, by waiting for at least one passenger, the vehicle control system may refrain from navigating away from a pick up location before the passenger or passengers who requested transportation from the vehicle are ready inside the vehicle. As such, a human operator may review images or other information provided by the vehicle to confirm whether or not the vehicle contains at least one passenger.

In a further example implementation, the vehicle control system may require that the current occupancy of the vehicle meets a desired occupancy involving multiple passengers (e.g., at least two passengers). For instance, in a situation where a passenger preordered the vehicle to transport three passengers total from a pickup location to a target destination, the desired occupancy may require that three passengers are located within the vehicle prior to the vehicle executing an autonomous operation.

At block 408, method 400 includes transmitting an occupancy confirmation from the computing system to the vehicle. The computing system may transmit the occupancy confirmation or other information to the vehicle control system or another system of the vehicle.

In some examples, upon receiving the occupancy confirmation or other information from the computing system, the vehicle control system may cause the vehicle to execute one or multiple autonomous driving operations. For instance, the vehicle control system may autonomously transport the passenger or passengers to one or more destinations requested by the passengers after determining that the current occupancy within the vehicle meets the desired occupancy.

As discussed above, the computing system may provide the occupancy confirmation to the vehicle (e.g., the vehicle control system) in various ways within examples. In some examples, the computing system can transmit the occupancy confirmation via a wireless communication to the vehicle. The type of wireless communication may depend on the proximity of the computing system relative to the receiving system of the vehicle. In other examples, the computing system may establish a wired connection with the vehicle. For instance, in a situation where the computing system is positioned inside or near the vehicle, the computing system may connect to the vehicle and provide the occupancy confirmation via a wired connection.

As indicated above, the vehicle may execute an autonomous operation in response to the occupancy confirmation. When the occupancy confirmation indicates that the occupancy fails to meet the desired occupancy, the vehicle may be configured to perform a particular operation. For instance, the vehicle may remain stationary until receiving another confirmation from the computing system that indicates the occupancy meets the desired occupancy. In other examples, the vehicle may stop when traveling or perform another operation in response to receiving an indication that the occupancy does not meet the desired occupancy. In a further example, the vehicle may accept another ride request from a potential passenger and pick up that passenger in response to receiving an indication that the occupancy fails to meet a desired occupancy.

In other examples, the vehicle may execute one or multiple autonomous operations in response to receiving a confirmation that the occupancy meets a desired occupancy. For instance, upon receiving a confirmation from the computing system, the vehicle may navigate and transport a passenger or multiple passengers to one or multiple desired locations (e.g., a requested drop-off location for a passenger or passengers). As an example, the vehicle may drop off a first passenger at a first drop-off location requested by the first passenger and drop off a second passenger at a second drop-off location requested by the second passenger. In the example, in some instances, the vehicle control system may submit a request to the computing system to confirm the current occupancy after reaching the first drop-off location to ensure the first passenger exited the vehicle before traveling to the second drop-off location.

In a further example implementation, method 400 may further involve receiving sensor data indicating motion inside the vehicle and responsively transmitting a signal to the camera to capture one or more images. For instance, the computing system may receive sensor data indicating motion inside the vehicle from a proximity sensor positioned inside the vehicle. In response, the computing system may transmit a signal to the vehicle camera system to capture and provide one or more images depicting the interior of the vehicle. In an additional example, the vehicle control system may receive sensor data indicating motion inside the vehicle and cause the camera system to capture an image depicting the interior of the vehicle. The vehicle control system may responsively provide the image to the computing system along with a request for assistance.

In another example implementation, method 400 may further involve receiving sensor data from a tactile sensor that may indicate the presence of a passenger inside the vehicle. For instance, the computing system or the vehicle control system may receive sensor data indicating use of one or multiple seatbelts or measurements from tactile sensors positioned in the seats. As such, the sensor data can be used to confirm whether or not the current occupancy inside the vehicle meets a desired occupancy. In a further example, the computing system or the vehicle control system may cause the camera to capture one or multiple images depicting the interior of the vehicle in response to detecting the use of one or multiple seatbelts inside the vehicle.

In a further example implementation, the computing system receiving information and an assistance request from a vehicle control system may provide assistance without relying upon an input from a human operator. In particular, the computing system may process incoming images or other sensor information to help confirm whether or not the occupancy of the vehicle meets a desired occupancy. In further examples, the computing system may also provide assistance with identifying one or more passengers occupying the vehicle when requested by the vehicle control system. For instance, the computing system may utilize software that can compare images of passengers to a database containing images of potential passengers in order to identify one or multiple passengers. The database may be developed based on prior passengers that utilized the vehicle service or passengers who provided information to the database. In some examples, a human operator may use the database when determining identities or passenger-profiles for one or multiple passengers occupying a vehicle.

In some example implementations, when requesting assistance, the vehicle control system may generate and provide a natural-language question to the computing system. For instance, the vehicle control system may query the computing system with a question, such as "Are there currently three passengers occupying the vehicle?" or "Is this passenger 'name'?" In turn, the computing system may display the question or questions for a human operator to view and provide a "yes" or "no" confirmation back to the vehicle control system. The binary fashion associated with a "yes" or "no" confirmation may enable the vehicle control system to proceed with appropriate autonomous operations in response. In further examples, the computing system may formulate the assistance request from the vehicle control system such that the assistance request appears as a natural-language question for the human operator using the computing system.

In a further example, a vehicle control system may gather additional information about a passenger by attempting to establish communication between the passenger's device. For instance, the vehicle control system may transmit a query that requests to establish a connection with a passenger's device (e.g., smartphone, wearable computing device). Upon establishing the connection, the vehicle control system may determine that the particular passenger is present inside the vehicle and may request additional information from the passenger (e.g., the passenger's profile associated with the vehicle use). The connection may be established using Bluetooth, WiFi, or another form of peer to peer communication. For instance, the vehicle control system may connect with a device of a passenger by transmitting a particular audio signal that device may respond by establishing a connection.

In some example implementations, the vehicle control system or other system of the vehicle may submit a request for assistance to one or multiple computing systems in response to determining that a determination made by the vehicle control system fails below a threshold confidence level. For instance, the vehicle control system may estimate that three passengers are currently occupying the vehicle, but may determine that the estimation falls below a predefined threshold confidence level. In response, the vehicle control system may transmit an assistance request to confirm whether or not three passengers are currently occupying the vehicle. The vehicle control system may transmit a similar request in other situations. For instance, when attempting to identify the passenger-profile of a passenger occupying the vehicle, the vehicle control system may seek assistance when the identification process yields a confidence level below a threshold confidence level.

In some example implementations, a sensor or multiple sensors may capture sensor data that triggers an interior camera to capture an image of the interior of the vehicle to send to the computing system. For example, the camera may capture images of the interior of the vehicle in response to a microphone detecting audio (e.g., the voice of a passenger) inside the vehicle. In another example, the camera may capture images depicting the occupancy of the vehicle in response to an exterior camera capturing an image of one or more potential passengers entering into the vehicle. For instance, a vehicle system may analyze the images captured by the exterior camera and transmit a signal to one or multiple interior cameras to capture images that may depict the current occupancy of the vehicle.

Figure 5:
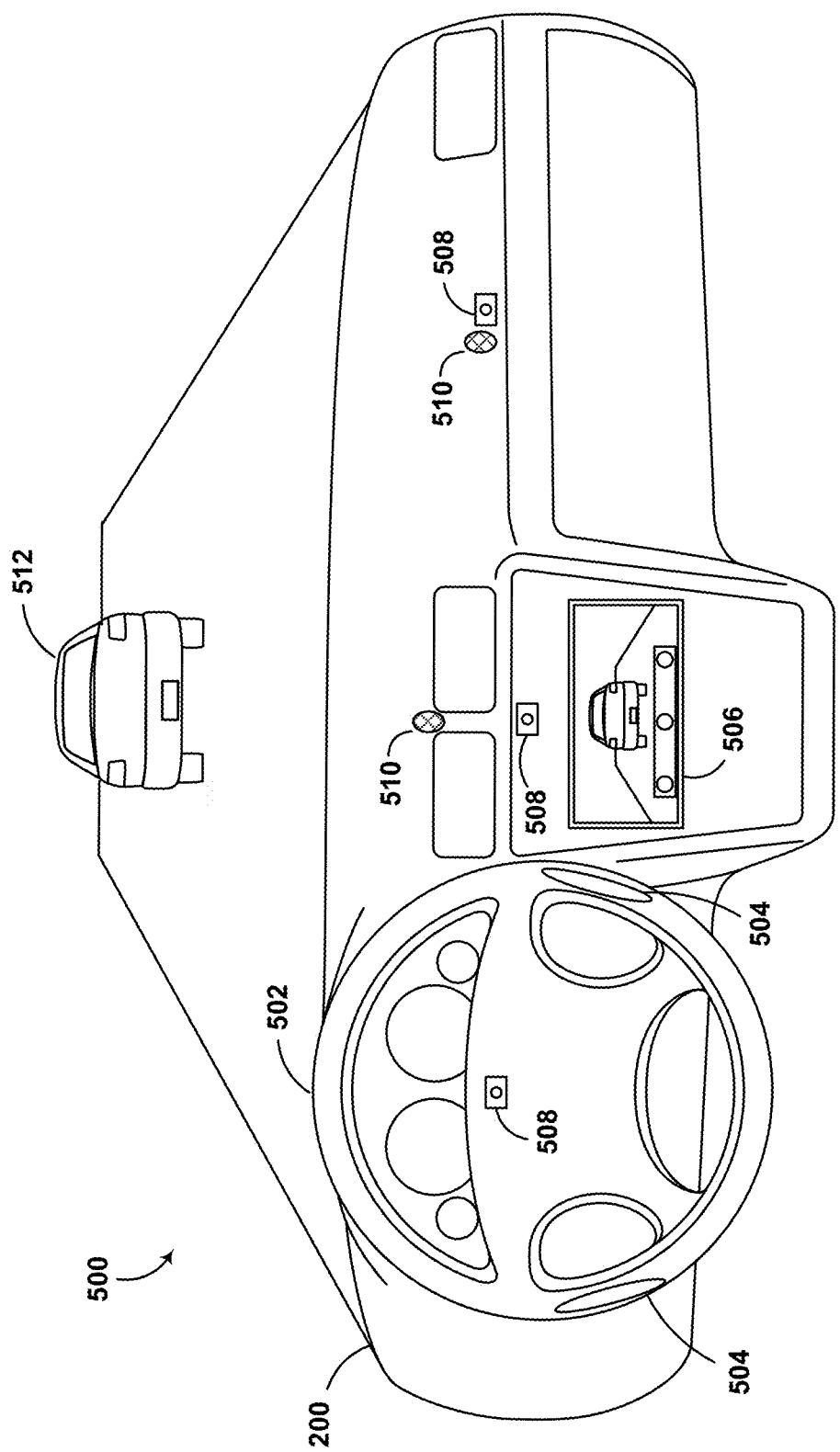
FIG. 5 is a conceptual illustration of an interior of a vehicle, according to example implementations.

FIG. 5 is conceptual illustration 500 of an interior of vehicle 200, according to example implementations. The vehicle 200 includes components that the vehicle control system may utilize to gather information to provide to another computing system along with a request for assistance. For instance, the vehicle includes cameras 508 and microphones 510 that may capture images and audio that can be displayed by another computing system for a human operator to review and utilize to determine if the occupancy of the vehicle meets a desired occupancy.

As shown in FIG. 5, the interior of vehicle 200 includes steering wheel 502 configured with tactile sensors 504 as well as multimedia system 506, cameras 508, and microphones 510. These sensors represent potential sensors that may capture and provide information that represents the current occupancy of vehicle 200. Additional configurations are possible, including implementations where components are combined. For instance, multimedia system 506, cameras 508, and microphones 510 may operate as a single system rather than separate components.

Tactile sensors 504 coupled to steering wheel 502 may detect the hands of a passenger grabbing steering wheel 502 indicating the presence of a passenger within vehicle 200. For instance, tactile sensors 504 may assist in representing the occupancy of vehicle 200 in situations where vehicle 200 is capable of switching between autonomous and manual operation. In a further example, tactile sensors 504 may indicate the presence of a driver when vehicle 200 is configured to operate in a manual mode. In some implementations, vehicle 200 may lack steering wheel 502. As a result, vehicle 200 may include tactile sensors 504 at other positions.

In a further example, tactile sensors 504 may detect the presence of at least one potential passenger. In response to receiving a detection of a passenger, the vehicle control system may cause one or more cameras 508 to capture images depicting the interior of vehicle 200.

Shown centrally positioned in vehicle 200, multimedia system 506 may include audio and video elements that enable passengers to modify the current multimedia settings of vehicle 200. The components of multimedia system 506 may capture information that may indicate the occupancy of vehicle 200. For instance, multimedia system 506 may detect the presence of at least one passenger when a passenger adjusts settings of vehicle 200, such as the temperature, audio (e.g., music) or audiovisuals produced by multimedia system 506, etc. In response to detecting a modification at the multimedia system 506, one or more cameras 508 may be configured to capture images that depict the current occupancy of vehicle 200.

In some instances, multimedia system 506 may consolidate data captured by other sensors of vehicle 200. For example, multimedia system 506 may utilize video captured by cameras 508 and audio captured by microphones 510. In a further example, multimedia system 506 may enable a passenger to engage in wireless communication with other computing devices (e.g., remote computing system 302). For instance, a passenger may engage in audiovisual communication with a human operator positioned at computing system 302. This can enable a passenger to request help from the operator at a computing system.

Cameras 508 may capture and convey images or video representing the current occupancy of vehicle 200, which may enable a human operator to view the interior of vehicle 200. As such, a human operator may assist with determining the number of passengers occupying vehicle 200 or identifying one or more passengers. The orientation and position of cameras 508 can vary within examples.

Additionally, microphones 510 positioned in the interior of vehicle 200 may capture audio that occurs inside vehicle 200, including voices of passengers or other audio (e.g., a passenger turns on music at multimedia system 506). The information may convey the presence of multiple passengers based on different voices captured by microphones 510.

Figure 6:
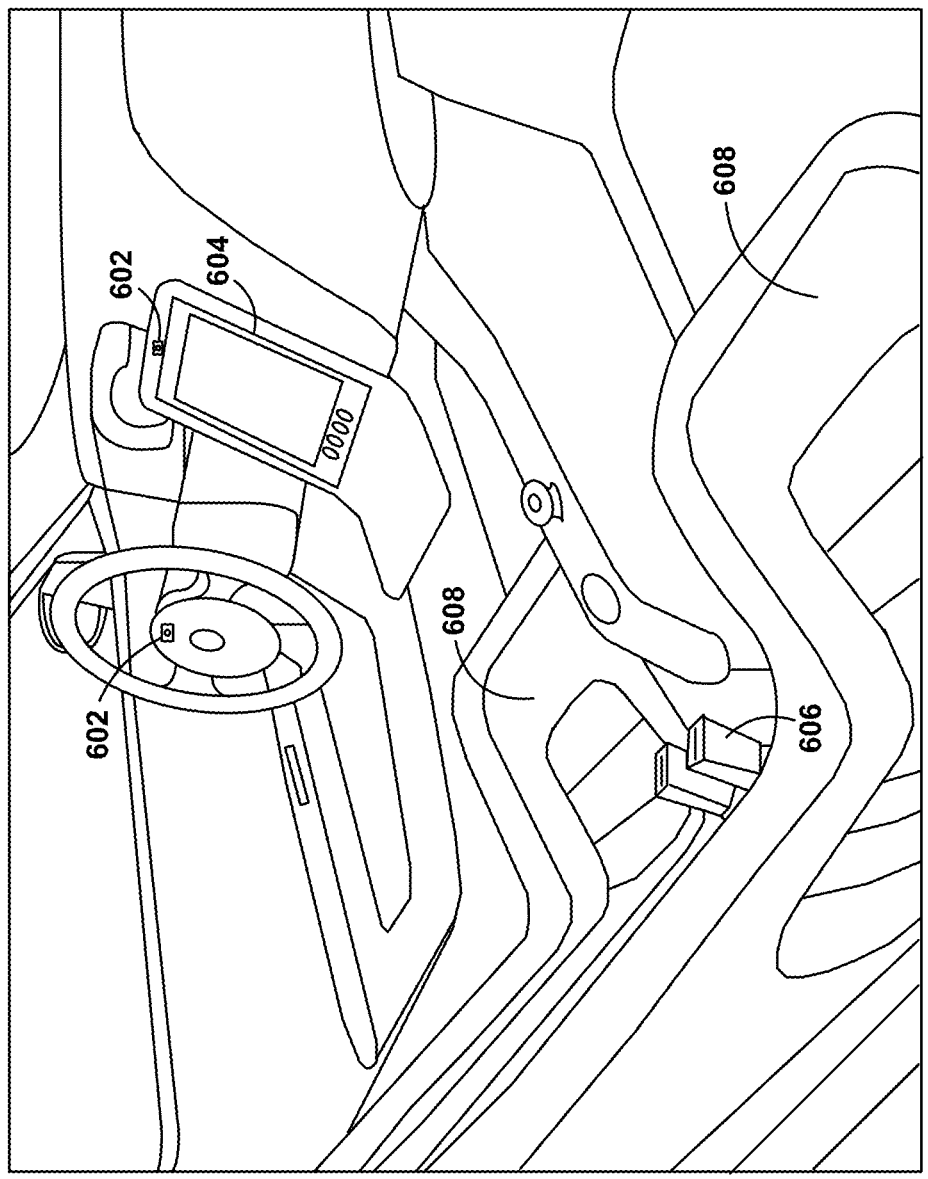
FIG. 6 is another conceptual illustration of an interior of a vehicle, according to example implementations.

FIG. 6 is another conceptual illustration 600 of an interior of vehicle 200, according to example implementations. Similar to the representation depicted in FIG. 5, the conceptual illustration 600 represents a layout of sensors of vehicle 200 that can be used to provide information to another computing system to enable a human operator to use to assist the vehicle control system of vehicle 200. As such, the interior of vehicle 200 includes cameras 602, multimedia system 604, seatbelt sensors 606, and tactile sensors 608 positioned within seats of vehicle 200. Cameras 602 and multimedia system 604 are similar to cameras 508 and multimedia system 506 discussed with regards to FIG. 5.

Seatbelt sensors 606 may detect the presence of passengers within vehicle 200 based on seatbelt use. Particularly, each seatbelt sensor 606 may detect when a seatbelt is used by a passenger. Although seatbelt sensors 606 are shown in the receptacles, they may have other positions within examples (e.g., on the strap of the seatbelt). Cameras 602 may be triggered to capture one or multiple images/video depicting the interior of vehicle 200 in response to a seatbelt sensor 606 detecting use by a passenger. In a further example, the vehicle control system may predict the number of passengers currently occupying vehicle 200 based on the number of seatbelts currently in use.

The seats of vehicle 200 include tactile sensors 608 that may measure the presence of passengers in vehicle 200. In some instances, tactile sensors 608 may provide information that indicates weights of passengers, which may help assist a remote human operator to determine additional information about the passengers (e.g., whether a passenger is an adult or child). Cameras 602 may be triggered to capture one or multiple images/video depicting the interior of vehicle 200 in response to a tactile sensor 608 detecting the presence of a passenger. In a further example, the vehicle control system may predict the number of passengers currently occupying vehicle 200 based on the number of seats detecting passengers using tactile sensors 608.

Figure 7:
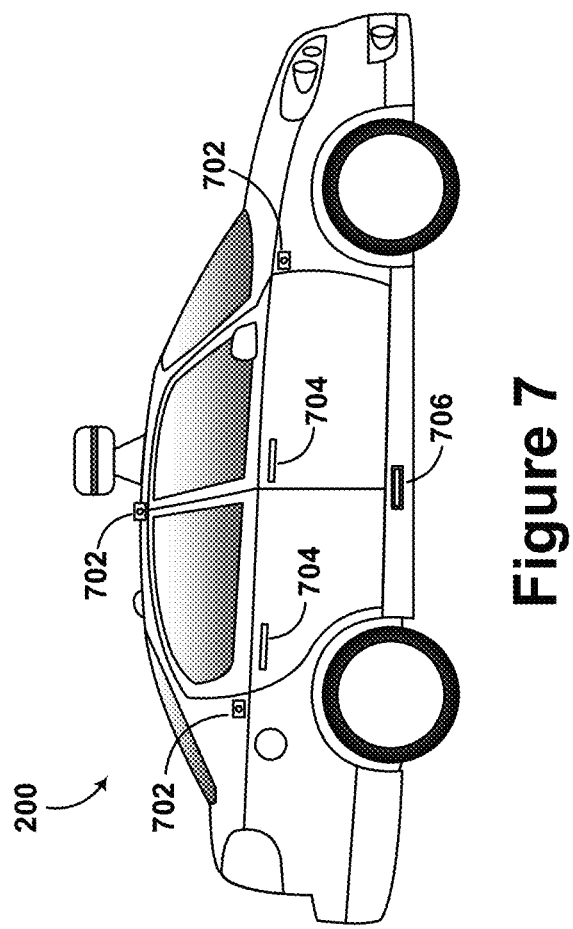
FIG. 7 is a conceptual illustration of an exterior of a vehicle, according to example implementations.

In some example implementations, the occupancy information provided by a vehicle control system to one or multiple other computing systems may include measurements from one or more sensors positioned on the exterior of vehicle 200. For example, FIG. 7 is conceptual illustration 700 of an exterior of vehicle 200, which shows cameras 702, door handle sensors 704, and proximity sensors 706. These external sensors of vehicle 200 may be configured to capture information related to passengers entering and exiting vehicle 200 that may help assist determining if the occupancy of vehicle 200 meets a desired occupancy. In other examples, the exterior of vehicle 200 can have more or less sensors arranged in other potential configurations.

Each camera 702 may be positioned to capture images of the area nearby a door or multiple doors of vehicle 200. With such a configuration, cameras 702 may capture images and/or videos of passengers entering or exiting vehicle 200. As a result, computing system 302 may receive images and/or video of one or more passengers entering into vehicle 200 via one or more doors of vehicle 200 from cameras 702. In an example implementation, interior cameras may be configured to capture images depicting the interior of vehicle 200 in response to one or more cameras 702 capturing images of a passenger or passengers entering or exiting vehicle 200.

Door handle sensors 704 may detect the hand of passengers that open the doors of vehicle 200 to enter. Vehicle 200 may similarly include door handle sensors positioned on the interior handles of the doors. Proximity sensor 706 is shown positioned at a base of vehicle 200 proximate to the ground. Similar to door handle sensors 704, proximity sensor 706 may detect the presence of potential passengers as the passengers approach vehicle 200. In further examples, exterior cameras may have lens and other elements that enable the cameras to capture images of passengers entering or exiting the vehicle when the vehicle's environment lacks adequate lighting (e.g., at night). In some examples, interior cameras and microphones may be configured to capture images and audio in response to door handle sensors 704 or proximity sensor 706 detecting a passenger entering or exiting vehicle 200.

For example, a computing system positioned at a remote location from a vehicle (e.g., remote computing system 302) may receive occupancy information from at least one sensor of the vehicle. Remote computing system 302 may be associated with a human operator that can utilize the occupancy information to communicate with one or more systems of the vehicle via wireless communication.

Figure 8:
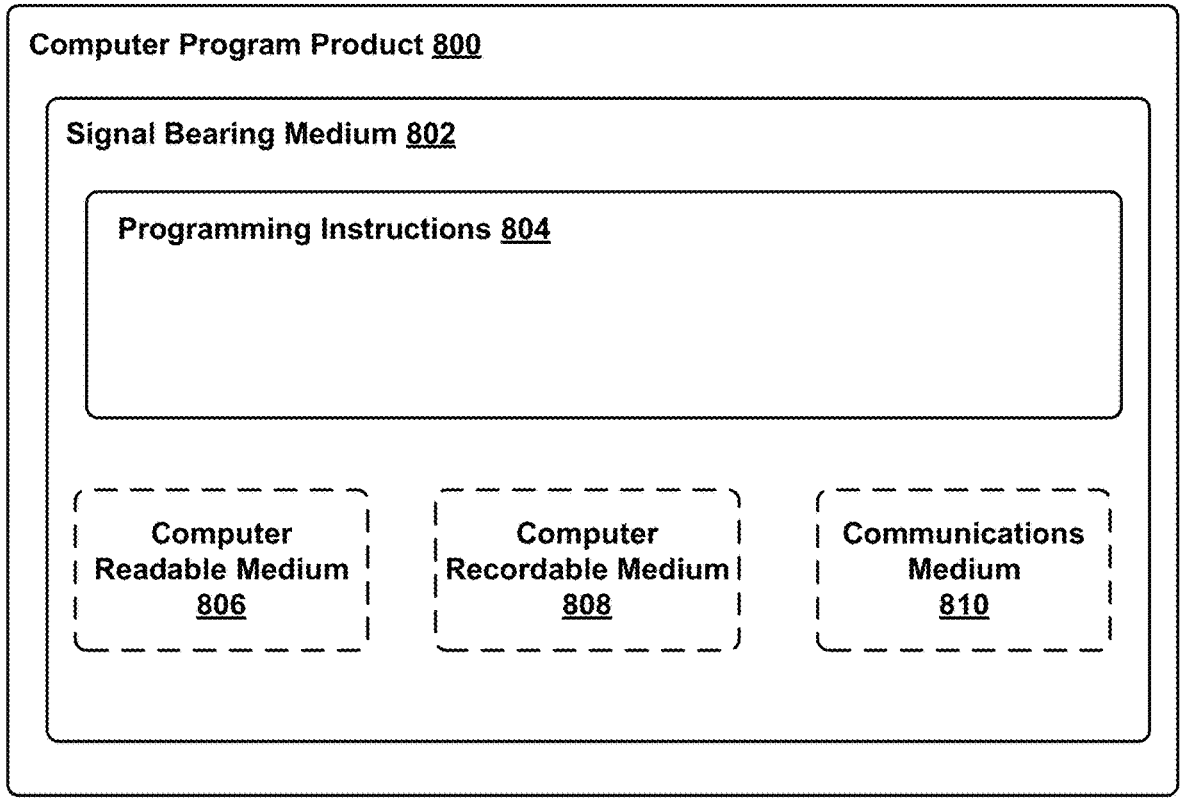
FIG. 8 is a schematic diagram of a computer program, according to example implementations.

FIG. 8 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 800 is provided using signal bearing medium 802, which may include one or more programming instructions 804 that, when executed by one or more processors may provide functionality or portions of the functionality described above with respect to FIGS. 1-7.

In some examples, the signal bearing medium 802 may encompass a non-transitory computer-readable medium 806, such as, but not limited to, a hard disk drive, a Compact Disc (CD), a Digital Video Disk (DVD), a digital tape, memory, components to store remotely (e.g., on the cloud) etc. In some implementations, the signal bearing medium 802 may encompass a computer recordable medium 808, such as, but not limited to, memory, read/write (R/W) CDs, R/W DVDs, etc.

In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Similarly, the signal bearing medium 802 may correspond to a remote storage (e.g., a cloud). A computing system may share information with the cloud, including sending or receiving information. For example, the computing system may receive additional information from the cloud to augment information obtained from sensors or another entity.

Thus, for example, the signal bearing medium 802 may be conveyed by a wireless form of the communications medium 810.

The one or more programming instructions 804 may be, for example, computer executable and/or logic implemented instructions. In some examples, a computing device such as the computer system 112 of FIG. 1 may be configured to provide various operations, functions, or actions in response to the programming instructions 804 conveyed to the computer system 112 by one or more of the computer readable medium 806, the computer recordable medium 808, and/or the communications medium 810.

The non-transitory computer readable medium could also be distributed among multiple data storage elements and/or cloud (e.g., remotely), which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

Figure 9:
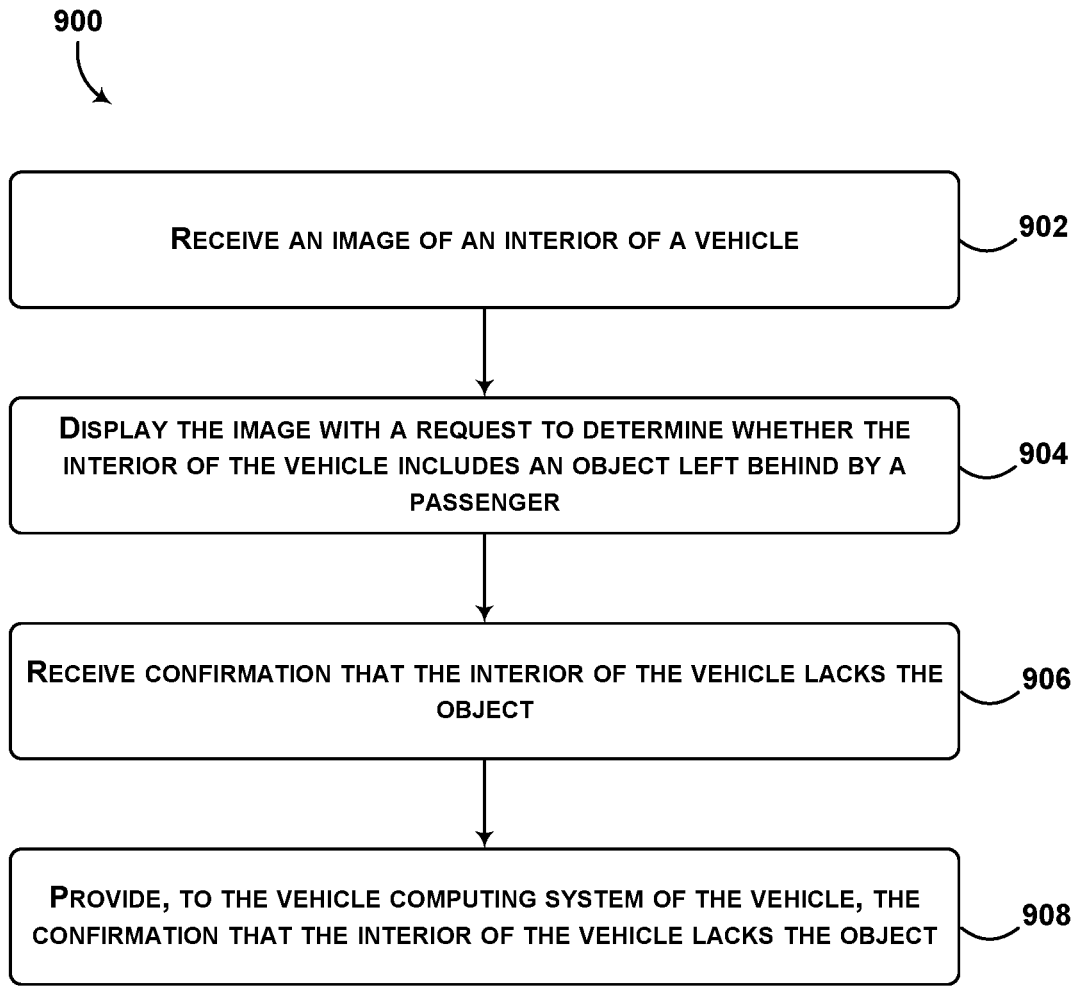
FIG. 9 is a flow chart of a method for determining if a passenger left an object behind in a vehicle, according to example implementations.

As shown in method 900 illustrated in FIG. 9, a vehicle control system may submit a request for assistance to confirm that all passengers exiting the vehicle did not leave any items (e.g., purse, cellphone, and bag) behind inside the vehicle. For instance, at block 902 of method 900, the vehicle control system may submit a request for assistance from a human operator to confirm that the passengers did not leave any personal belongings behind in the vehicle after receiving transportation from the vehicle. At block 904 of method 900, the vehicle control system may transmit one or multiple images to a computing system along with the request that can enable a human operator (or the computing system) to identify any items that the recent passengers may have left behind. At block 906 of method 900, upon receiving a confirmation from the computing system (or the human operator via the computing system) that indicates that there are no items left in the vehicle from the passengers, the vehicle control system at block 908 of method 900 may initiate an autonomous operation (e.g., go pick up a new passenger).

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
receiving, at a computing system, an image of an interior of a vehicle, wherein the image is received from a camera positioned inside the vehicle, and wherein the computing system is positioned remotely from the vehicle and accessible by an operator to provide assistance to a plurality of vehicles;
displaying, by the computing system on a graphical user interface, the image with a request to determine whether the interior of the vehicle includes an object left behind by a passenger;
receiving, at the computing system, confirmation that the interior of the vehicle lacks the object; and
providing, by the computing system to a vehicle computing system of the vehicle, the confirmation that the interior of the vehicle lacks the object, wherein the vehicle computing system is configured to execute an autonomous operation in response to receiving the confirmation, and
wherein displaying the image with the request to determine whether the interior of the vehicle includes the object comprises:
displaying the image with text that requests for confirmation or denial that the interior includes the object left behind by the passenger.

2. The method of claim 1, wherein providing the confirmation that interior of the vehicle lacks the object further comprises:
providing instructions to proceed with navigation.

3. The method of claim 1, wherein receiving the image of the interior of the vehicle comprises:
receiving a set of images of the interior of the vehicle.

4. The method of claim 1, further comprising:
receiving audio via a microphone positioned in the interior of the vehicle.

5. The method of claim 1, further comprising:
obtaining sensor data indicating the passenger exited the vehicle via a tactile sensor, wherein the tactile sensor is coupled to a seatbelt inside the vehicle.

6. The method of claim 1, wherein displaying the image with text that requests for confirmation or denial that the interior includes the object left behind by the passenger comprises:
displaying the image with the text conveying a natural language question that requests for confirmation or denial that the interior includes the object left behind by the passenger.

7. The method of claim 1, wherein receiving confirmation that the interior of the vehicle lacks the object comprises:
receiving an operator input that confirms the interior of the vehicle lacks the object.

8. The method of claim 1, further comprising:
displaying profile information for the passenger.

9. The method of claim 1, further comprising:
receiving an indication that the interior of the vehicle includes one or more objects; and
providing the indication that the interior of the vehicle includes the one or more objects to the vehicle computing system of the vehicle.

10. The method of claim 9, wherein receiving the indication that the interior of the vehicle includes one or more objects comprises:
receiving an input that identifies a given object located in the interior of the vehicle; and
wherein providing the indication comprises:
providing instructions based on the identification of the given object.

11. The method of claim 10, wherein providing instructions based on the identification of the given object comprises:
causing the vehicle to remain stationary.

12. A system comprising:
a vehicle having a vehicle computing system;
a computing device positioned remotely from the vehicle and accessible by an operator to provide assistance to a plurality of vehicles, wherein the computing device is configured to:
receive an image of an interior of a vehicle, wherein the image is received from a camera positioned inside the vehicle;
display, on a graphical user interface, the image with a request to determine whether the interior of the vehicle includes an object left behind by a passenger wherein the image is displayed with text that requests for confirmation or denial that the interior includes the object left behind by the passenger:
  receive confirmation that the interior of the vehicle lacks the object; and
  provide, to a vehicle computing system of the vehicle, the confirmation that the interior of the vehicle lacks the object, wherein the vehicle computing system is configured to execute an autonomous operation in response to receiving the confirmation.

13. The system of claim 12, wherein the computing device is further configured to:
  provide, to the vehicle computing system of the vehicle, instructions to proceed with navigation to a subsequent passenger.

14. The system of claim 12, wherein the computing device is further configured to:
  receive an indication that the passenger exited the vehicle in addition to the image of the interior of the vehicle.

15. The system of claim 12, wherein the computing device is further configured to:
  transmit an identification of the object left behind by the passenger to the vehicle computing system, wherein the vehicle computing system is configured to cause the vehicle to remain stationary based on receiving the identification of the object.

16. The system of claim 12, wherein the computing device is further configured to:
  generate a confirmation that the interior of the vehicle lacks the object via computer vision techniques.

17. The system of claim 12, wherein the text conveys a natural language question that requests for confirmation or denial that the interior includes the object left behind by the passenger.

18. A non-transitory computer readable medium having stored therein instructions executable by one or more processors to cause a computing system to perform functions comprising:
  receiving an image of an interior of a vehicle, wherein the image is received from a camera positioned inside the vehicle, wherein the computing system is positioned remotely from the vehicle and accessible by an operator to provide assistance to a plurality of vehicles;
  displaying, on a graphical user interface, the image with a request to determine whether the interior of the vehicle includes an object left behind by a passenger;
  receiving confirmation that the interior of the vehicle lacks the object; and
  providing, to a vehicle computing system of the vehicle, the confirmation that the interior of the vehicle lacks the object, wherein the vehicle computing system is configured to execute an autonomous operation in response to receiving the confirmation, and
  wherein displaying the image with the request to determine whether the interior of the vehicle includes the object comprises:
    displaying the image with text that requests for confirmation or denial that the interior includes the object left behind by the passenger.

19. The non-transitory computer readable medium of claim 18, wherein displaying the image with text that requests for confirmation or denial that the interior includes the object left behind by the passenger comprises:
  displaying the image with the text conveying a natural language question that requests for confirmation or denial that the interior includes the object left behind by the passenger.

20. The non-transitory computer readable medium of claim 18, wherein receiving confirmation that the interior of the vehicle lacks the object comprises:
  receiving an operator input that confirms the interior of the vehicle lacks the object.

* * * * *